United States Patent
Apte et al.

(10) Patent No.: US 9,582,776 B2
(45) Date of Patent: Feb. 28, 2017

(54) METHODS AND SYSTEMS FOR PROVIDING A COMPREHENSIVE VIEW OF IT ASSETS AS SELF SERVICE INQUIRY/UPDATE TRANSACTIONS

(75) Inventors: Umesh Madhav Apte, San Ramon, CA (US); Jason Aron Alonzo, Fair Oaks, CA (US); John Leong Yee, San Mateo, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 474 days.

(21) Appl. No.: 12/576,988

(22) Filed: Oct. 9, 2009

(65) Prior Publication Data
US 2011/0087601 A1 Apr. 14, 2011

(51) Int. Cl.
G06F 21/00 (2013.01)
G06Q 10/06 (2012.01)
G06F 21/10 (2013.01)
G06Q 40/00 (2012.01)

(52) U.S. Cl.
CPC ........... *G06Q 10/06* (2013.01); *G06F 21/105* (2013.01); *G06Q 10/063* (2013.01); *G06Q 40/12* (2013.12)

(58) Field of Classification Search
CPC ..................................................... G06F 21/00
USPC .................................................... 705/50–79
See application file for complete search history.

(56) References Cited

U.S. PATENT DOCUMENTS

| | | |
|---|---|---|
| 5,138,712 A | 8/1992 | Corbin |
| 6,056,786 A | 5/2000 | Rivera et al. |
| 6,421,571 B1 * | 7/2002 | Spriggs ................. G05B 15/02 345/629 |
| 7,013,294 B1 | 3/2006 | Sekigawa et al. |
| 7,085,822 B1 | 8/2006 | Donatelli et al. |
| 7,313,512 B1 | 12/2007 | Traut et al. |
| 7,480,669 B2 | 1/2009 | Lo et al. |
| 7,568,018 B1 | 7/2009 | Hove et al. |

(Continued)

FOREIGN PATENT DOCUMENTS

| | | |
|---|---|---|
| EP | 1 811 442 A1 | 7/2007 |
| EP | 1818823 A2 | 8/2007 |
| JP | 2004118501 A * | 4/2004 ............. G06F 17/60 |

OTHER PUBLICATIONS

U.S. Appl. No. 11/828,234, Jun. 23, 2011, Non-Final Office Action.

(Continued)

*Primary Examiner* — James A Reagan
(74) *Attorney, Agent, or Firm* — Kilpatrick Townsend & Stockton LLP (57) ABSTRACT

This disclosure describes, generally, methods and systems for providing consolidated self service IT asset management. The method includes displaying, on a display device of an IT asset management system, an IT asset management user interface (UI), logging in, by an IT assets custodian, to the IT assets management UI, and displaying, at the IT assets management UI, an aggregated view of all IT assets assigned to the IT asset custodian. The aggregated view of the IT assets is generated from a plurality of IT asset assignment sources. The method further includes providing, the IT asset custodian with the ability to management the assigned IT assets and accurately account for the asset according to its actual use.

20 Claims, 8 Drawing Sheets

(56) References Cited

U.S. PATENT DOCUMENTS

| | | | |
|---|---|---|---|
| 7,752,139 | B2 | 7/2010 | Hu |
| 7,809,648 | B2 | 10/2010 | Misra et al. |
| 7,890,950 | B1 | 2/2011 | Nanavati et al. |
| 8,407,669 | B2 | 3/2013 | Yee et al. |
| 8,504,550 | B2 | 8/2013 | Hall et al. |
| 8,751,567 | B2 | 6/2014 | Chang et al. |
| 2001/0047276 | A1 | 11/2001 | Eisenhart |
| 2003/0055749 | A1 | 3/2003 | Carmody et al. |
| 2003/0154199 | A1 | 8/2003 | Thomas et al. |
| 2004/0030564 | A1 | 2/2004 | Hartinger et al. |
| 2004/0117784 | A1 | 6/2004 | Endoh |
| 2005/0222867 | A1 | 10/2005 | Underwood et al. |
| 2005/0257209 | A1 | 11/2005 | Adams et al. |
| 2006/0111874 | A1 | 5/2006 | Curtis et al. |
| 2006/0178954 | A1* | 8/2006 | Thukral ............... G06Q 10/087 705/28 |
| 2006/0282519 | A1 | 12/2006 | Trevathan et al. |
| 2007/0061393 | A1 | 3/2007 | Moore |
| 2008/0104532 | A1 | 5/2008 | Stambaugh |
| 2008/0183626 | A1 | 7/2008 | Romero et al. |
| 2008/0243921 | A1* | 10/2008 | Ellisor ............. G06Q 10/06375 |
| 2008/0244091 | A1 | 10/2008 | Moore et al. |
| 2008/0320486 | A1* | 12/2008 | Bose et al. .................... 718/105 |
| 2009/0031286 | A1* | 1/2009 | Yee ........................ G06Q 10/10 717/120 |
| 2009/0063559 | A1 | 3/2009 | Rhodes et al. |
| 2009/0138792 | A1 | 5/2009 | Cudich et al. |
| 2009/0249446 | A1 | 10/2009 | Jenkins et al. |
| 2009/0276771 | A1 | 11/2009 | Nickolov et al. |
| 2009/0300098 | A1 | 12/2009 | Millmore et al. |
| 2009/0327416 | A1 | 12/2009 | Mankovski |
| 2010/0023506 | A1 | 1/2010 | Sahni et al. |
| 2010/0268719 | A1 | 10/2010 | Cormode et al. |
| 2011/0087604 | A1 | 4/2011 | Chung et al. |
| 2011/0154370 | A1 | 6/2011 | Yu |
| 2012/0089681 | A1 | 4/2012 | Chowdhury et al. |
| 2013/0212170 | A1 | 8/2013 | Chung et al. |
| 2013/0232154 | A1 | 9/2013 | Hall et al. |

OTHER PUBLICATIONS

U.S. Appl. No. 11/828,234, Dec. 21, 2011, Final Office Action.
U.S. Appl. No. 11/828,234, Feb. 28, 2012, Advisory Action.
U.S. Appl. No. 11/828,234, Jun. 8, 2012, Non-Final Office Action.
U.S. Appl. No. 11/828,234, Nov. 23, 2012, Notice of Allowance.
U.S. Appl. No. 12/973,393, Jul. 6, 2011, Non-Final Office Action.
U.S. Appl. No. 12/973,393, Jan. 23, 2012, Final Office Action.
U.S. Appl. No. 12/973,393, Jun. 28, 2012, Non-Final Office Action.
U.S. Appl. No. 12/973,393, Oct. 7, 2013, Final Office Action.
U.S. Appl. No. 13/369,986, Jan. 7, 2014, No Office Actions as of this date.
U.S. Appl. No. 13/369,986, Notice of Allowance mailed on Jan. 29, 2014, 15 pages.
U.S. Appl. No. 13/369,986, Notice of Allowance mailed on Apr. 28, 2014, 10 pages.
U.S. Appl. No. 12/973,393, Non-Final Office Action mailed only Jul. 1, 2016, 22 pages.

Laszewski, et al., "A Repository Service for Grid Workflow Components," International Conference on Autonomic and Autonomous Systems, Institute of Electrical and Electronics Engineers, 2005, 10 pages.
Trask, et al., "RIGR—A Repository Model Based Approach to Management," Workshop of the pUML-Group held together with the <<UML>> 2001 on Practical UML-Based Rigorous Development Methods—Countering or Integrating the eXtremists, Oct. 1, 2001, pp. 258-269.
U.S. Appl. No. 11/828,234, filed Jul. 25, 2007, Notice of Allowance mailed Nov. 23, 2012, 8 pages.
U.S. Appl. No. 11/828,234, filed Jul. 25, 2007, Final Office Action mailed Dec. 21, 2011, 16 pages.
U.S. Appl. No. 11/828,234, filed Jul. 25, 2007, Advisory Action mailed Feb. 28, 2012, 3 pages.
U.S. Appl. No. 11/828,234, filed Jul. 25, 2007, Office Action mailed Jun. 8, 2012, 18 pages.
U.S. Appl. No. 12/973,393, filed Dec. 20, 2010, Final Office Action mailed Jan. 23, 2012, 14 pages.
U.S. Appl. No. 12/973,393, filed Dec. 20, 2010, Office Action mailed Jun. 28, 2012, 13 pages.
Kaushik, P., "Micro-Blogging for Businesses: Mini Version of Blogs: Modern Tool for Creating Product Awareness," [online], Jan. 4, 2009, [Retrieved on Jul. 18, 2011]. Retrieved from: http://www.suite101.com/content/microblogging-for-businesses-a88090, 3 pages.
MacDonald, J., "Intelligent Middleware in the Realtime Enterprise," [online], Apr. 1, 2010, [retrieved on Jul. 19, 2011], Retrieved from: http://www. enterpriseirregulars.com/15799, 3 pages.
Maisami, Y., et al., "Boost Productivity and Collaboration with Enterprise Micro-Blogging," [online] Copyright 2005-2011, [retrieved on Jul. 18, 2011]. Retrieved from: http://myarticlearchive.com/articles/10/007.htm, 2 pages.
Milstein, S., "@Dell Outlet: Raising Awareness, Increasing Sales, Measuring Results," Twitter 101 for Business—A Special Guide (Print version), pp. 12-13.
U.S. Appl. No. 11/828,234, filed Jul. 25, 2007, Office Action mailed Jun. 23, 2011, 14 pages.
U.S. Appl. No. 12/973,393, filed Dec. 20, 2010, Office Action mailed Jul. 6, 2011, 14 pages.
Blazent, "Centralizing and Qualifying IT Business Data," 2008, http://www.blazent.com/downloads/WP%20-%20IT%20Business%20Data.pdf, 12 pages.
Peregrine Systems, "Peregrine Systems Introduces Asset Tracking Solution as a Foundation for Enterprise Lifecycle Asset Management," obtained Mar. 13, 2009, http://www/prnewswire.com/cgi-bin/stories.pl?ACCT=104%STORY=www/story/09-21-2004-0002255542&EDATE, 3 pages.
Provance, "Asset Life Cycle Management," obtained Mar. 13, 2009, http://www.provance.com/en/Products/Asset_Life_Cycle_Management.html, 2 pages.
Mitchell, Todd and Valenzuela, Hector, "Extending Altiris Inventory Solution," Dell Power Solutions, May 2005, http://www.dell.com/downloads/global/power/ps2q05-20050146-Altiris.pdf, 4 pages.
Computer Associates, "Unicenter Asset Management Release 4.0," 2004, http://www.per4mance.cz/pdf/AssetManagement.pdf, 6 pages.
U.S. Appl. No. 12/973,393, Final Office Action mailed on Oct. 7, 2013, 16 pages.

* cited by examiner

Self-Service IT Assets

Employee: IXHEEE160 🔍 Chen, Devon    Transfer Asset

*Depending upon access specification, this field may become protected where information about own self can be viewed Or information of all employees can be viewed.*

| Software Authorizations | Employee Groups | Device Groups | IT Devices (Custodian) | IT Devices (Primary User) |
|---|---|---|---|---|

| | Software Title | Authorization Type | No. of Licenses |
|---|---|---|---|
| 1 | Norton Antivirus | Individual | 2 |
| 2 | Microsoft Office 2003 | Group | |
| 3 | Microsoft SQL Server | Group | |
| 4 | Personal Oracle 10g | Group | |
| 5 | Embarcadero Rapid SQL 7.3.0 | Individual | 1 |

Link takes you to Software Autorization Page

FIG. 5A

| Software Authorizations | Employee Groups | Device Groups | IT Devices (Custodian) | IT Devices (Primary User) |
|---|---|---|---|---|

| Group Name | Group Descr | Group Owner |
|---|---|---|
| FIN-Super | FIN-Super Users | Champak, Bhumia |
| FIN-MGR | FIN-Managers | Wilson, Wade |
| FIN-FKFT | FIN-Frankfurt | Samson, Joe |

Link takes you to Employee Group Definition Page

FIG. 5B

| Software Authorizations | Employee Groups | Device Groups | IT Devices (Custodian) | IT Devices (Primary User) |
|---|---|---|---|---|

| Group Name | Group Descr | Group Owner |
|---|---|---|
| PROD-Servers | Priority one Servers | Chen, Devon |
| SAND-Boxes | Test Environment | Chen, Devon |

Link takes you to Device Group Definition Page (Only if is a Group Owner)

FIG. 5C

| Software Authorizations | Employee Groups | Device Groups | IT Devices (Custodian) | IT Devices (Primary User) |
|---|---|---|---|---|

| Serial No | IT Subtype | Tag Number | Manufacturer | Model | Asset | Custodian |
|---|---|---|---|---|---|---|
| 210025Y6 | Laptop | P210025Y6 | HP | d5100 | ITZ1056 | Chen, Devon |
| 123456Y7 | Server | S1234567 | IBM | Shark-II | ITZ1975 | Chen, Devon |

Link takes you to Device Detail Page

FIG. 5D

| Software Authorizations | Employee Groups | Device Groups | IT Devices (Custodian) | IT Devices (Primary User) |
|---|---|---|---|---|

| Serial No | IT Subtype | Tag Number | Manufacturer | Model | Asset | Custodian |
|---|---|---|---|---|---|---|
| 770025Y6 | Desktop | P770025Y6 | HP | d5100 | ITZ1153 | Chen, Devon |

Link takes you to Device Detail Page

FIG. 5E

Employee: IXHEEE160 🔍 Chen, Devon

Software Exceptions Custodian

| Software Title | Serial No | Authorization Type | Exception |
|---|---|---|---|
| 1 Microsoft Office 2003 | 210025Y6 | Group | Over Limit |
| 2 Personal Oracle 10g | 210025Y6 | Group | Over Limit |
| 3 Embarcadero Rapid SQL 7.3.0 | 210025Y6 | Individual | Over Limit |
| 4 EJB Java Beans | 123456Y7 | Individual | Unauthorized |
| 5 Embarcadero Rapid SQL 7.3.0 | 123456Y7 | Individual | Over Limit |

FIG. 6A

Employee: IXHEEE160 🔍 Chen, Devon

Software Compliance Summary

| Software Title | Employee Group | Authorized | Installed |
|---|---|---|---|
| 1 Microsoft Office 2003 | FIN-FKFT | 25 | 27 |
| 2 Microsoft SQL Server | FIN-FKFT | 10 | 12 |
| 3 Embarcadero Rapid SQL 7.3.0 | FIN-MGR | 10 | 11 |

Software Compliance Details

| Employee Group | Software Title | Employee | Serial No | Exception | Total Run Time |
|---|---|---|---|---|---|
| 1 FIN-FKFT | Microsoft Office 2003 | Bonds, Barry | 210025Y6 | Over Limit | 45" |
| 2 FIN-FKFT | Microsoft Office 2003 | Tarzan, Jane | 9012345Z1 | Over Limit | 360" |
| 3 FIN-FKFT | Microsoft Office 2003 | Smith, John | 210055Z6 | | 440" |
| 4 FIN-FKFT | Microsoft Office 2003 | Phillips, Sean | 901239Z91 | | 490" |

FIG. 6B

Self-Service IT Assets

Serial No: 123456Y7 🔍  Asset Tag: S1234567  Duplicate serial: No  Asset: ITZ1975  US001
IT Subtype: Server  Manufacturer: IBM  Model: Shark-II
Authorization Model: Employee / Device  Custodian: Chen, Devon  Transfer Asset

Software Installed

| Software Title | Authorization | Total Run Time |
|---|---|---|
| 1 Norton Antivirus | Over Limit | 399' |
| 2 Microsoft Office 2003 | Over Limit | 499' |
| 3 Microsoft SQL Server | Authorized | 599' |
| 4 Personal Oracle 10g | Authorized | 699' |
| 5 Embarcadero Rapid SQL 7.3.0 | Authorized | 799' |
| 6 Microsoft Project | Unauthorized | 120' |

Device Groups

| Group Name | Group Owner |
|---|---|
| PROD-Servers | Chen, Devon |
| FARM-Servers | Else, Ernie |

METHODS AND SYSTEMS FOR PROVIDING A COMPREHENSIVE VIEW OF IT ASSETS AS SELF SERVICE INQUIRY/UPDATE TRANSACTIONS

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates, in general, to IT asset management and, more particularly, to comprehensive view of IT asset management as self service inquiry/update transactions.

BACKGROUND

Typically, IT assets are managed in an enterprise with users assuming different roles and responsibilities. For example, a Software Engineer may use a desktop computer at the office and a laptop while traveling, whereas, a system support professional may use a PDA to correspond with clients. Some of the software installed on a given IT asset may be mandated by the enterprise, such as, virus detection, automatic backup, etc. There may also be instances of non-mandated software installed on the IT asset. Examples of non-mandated software may be project management software, document management software, database software, etc. The enterprise may have granted the developer a license of such non-mandated software or the developer may have installed a personal copy of the software (in this situation the user would be considered the custodian of the asset and is thus responsible for it).

Furthermore, a manager of a development team(s) is responsible for ensuring that adequate software and hardware resources are available for the development team(s). In this role, the manager may assign and/or authorize the use of software to the developers. Such authorization may occur at an individual level (where a user is authorized to install and use project management software), or authorization may occur at a group level to a group of employees working on same project. In such a scenario, the manager is responsible for the usage of the group, acting as an employee group owner, or the like.

Additionally, a group of servers may be used to manage a website of the enterprise (there is typically no individual user of these servers). The operating system and other software are executed with a generic sign-on privilege such as 'Admin' rather than individual sign-on such as 'John Doe'; however, there might be a manager which is responsible for both the hardware associated with the servers, as well as the software being executed on the servers. Such a role is typically referred to as a device group owner.

Thus, an IT asset user can be simultaneously a custodian of a PDA, an employee group owner responsible for authorization of project management software, a member of group that is authorized to use web authorization software, and an owner of a device group that includes servers used in, for example, a QA environment. As such, the associated IP (or IT) asset information is dispersed in many locations for a single user, which makes it incredibly difficult to manage IT assets. Current IT asset management product identifies all of these roles that can be assumed by an IT asset user details of all these roles and associated attributes are available only in discrete pages. A consolidated presentation for the end user is lacking in current systems, as well as a consolidated view of hardware attributes and installed software for an IT asset. In an effort to provide customers with a superior ownership experience, it is important to be able to provide this consolidated self service view.

BRIEF SUMMARY

Embodiments of the present invention are directed to a method of providing consolidated self service IT asset management. The method includes displaying, on a display device of an IT asset management system, an IT asset management user interface (UI), logging in, by an IT assets custodian, to the IT assets management UI, and displaying, at the IT assets management UI, an aggregated view of all IT assets assigned to the IT asset custodian. The aggregated view of the IT assets is generated from a plurality of IT asset assignment sources. The method further includes providing, the IT asset custodian with the ability to manage the assigned IT assets.

In a further embodiment, a method for providing consolidated self service IT asset management. The method includes recording software and/or hardware assets in an asset repository of an asset system, setting up, at the asset system, an IT asset management application, assigning, to an asset custodian, software and/or hardware licenses, and comparing an aggregated software and/or hardware asset repository with a compliance metric. The method further includes reviewing the software and/or hardware licenses assigned to the IT asset custodian, with the compliance metric to determine the IT asset custodian's compliance with the software and/or hardware license requirements, and updating, the software and/or hardware licenses assigned to the IT asset custodian, such that the assigned licenses are in compliance with the compliance metric.

In an alternative embodiment, a machine-readable medium for providing consolidated self service IT asset management. The machine-readable medium includes instructions for displaying, on a display device of an IT asset management system, an IT asset management user interface (UI), logging in, by an IT assets custodian, to the IT assets management UI, and displaying, at the IT assets management UI, an aggregated view of all IT assets assigned to the IT asset custodian. The aggregated view of the IT assets is generated from a plurality of IT asset assignment sources. The machine-readable medium further includes instructions for providing, the IT asset custodian with the ability to management the assigned IT assets.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIGS. 5A-5E illustrate user interfaces for providing consolidated self service IT asset management, in accordance with one embodiment of the present invention.

FIGS. 6A-6C illustrate user interfaces for providing consolidated self service IT asset management, in accordance with a further embodiment of the present invention.

DETAILED DESCRIPTION OF THE INVENTION

While various aspects of embodiments of the invention have been summarized above, the following detailed description illustrates exemplary embodiments in further detail to enable one of skill in the art to practice the invention. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Several embodiments of the invention are described below and, while various features are ascribed to different embodiments, it should be appreciated that the features described with respect to one embodiment may be incorporated with another embodiment as well. By the same token, however, no single feature or features of any described embodiment should be considered essential to the invention, as other embodiments of the invention may omit such features.

According to respects of the present invention, a consolidated view regarding the assignment and usage of IT assets by a user(s) across a single or different roles is provided. For example, a user should be able to view the use of IT assets from the perspective of a custodian, a software group owner, a member of a group authorized to use the software, a device group owner, etc. Further aspects of the present invention provide for a view for an IT asset showing details of hardware attributes and installed software. For example, providing a view of "everything about" an IT asset. Specifically, a view of hardware attributes, such as, model, manufacturer, number of CPU, etc. along with software titles installed on the IT asset. Such a view would display information from an asset repository as well as an employee perspective, and display financial information from the asset repository. Complete view of hardware from the IT perspective may be a domain expertise of a discovery system. Furthermore, the present invention provides a view of the hardware from a financial perspective.

Figure 1:
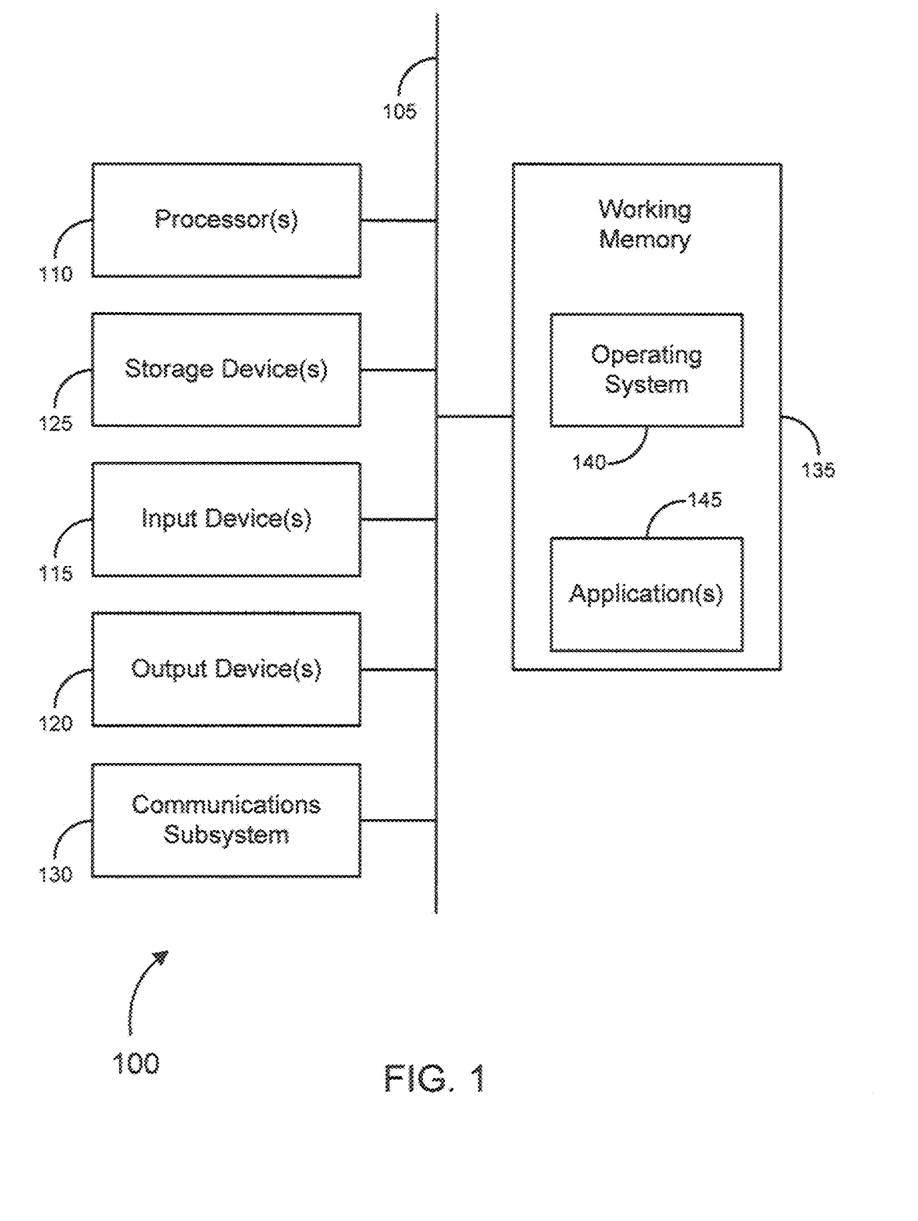
FIG. 1 is a generalized schematic diagram illustrating a computer system, in accordance with various embodiments of the present invention.

FIG. 1 provides a schematic illustration of one embodiment of a computer system 100 that can perform the methods of the invention, as described herein. It should be noted that FIG. 1 is meant only to provide a generalized illustration of various components, any or all of which may be utilized as appropriate. FIG. 1, therefore, broadly illustrates how individual system elements may be implemented in a relatively separated or relatively more integrated manner.

The computer system 100 is shown comprising hardware elements that can be electrically coupled via a bus 105 (or may otherwise be in communication, as appropriate). The hardware elements can include one or more processors 110, including without limitation, one or more general purpose processors and/or one or more special purpose processors (such as digital signal processing chips, graphics acceleration chips, and/or the like); one or more input devices 115, which can include without limitation a mouse, a keyboard and/or the like; and one or more output devices 120, which can include without limitation a display device, a printer and/or the like.

The computer system 100 may further include (and/or be in communication with) one or more storage devices 125, which can comprise, without limitation, local and/or network accessible storage and/or can include, without limitation, a disk drive, a drive array, an optical storage device, a solid state storage device such as a random access memory ("RAM") and/or a read-only memory ("ROM"), which can be programmable, flash updateable and/or the like. The computer system 100 might also include a communications subsystem 130, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 130 may permit data to be exchanged with a network (such as the network described below, to name one example), and/or any other devices described herein. In many embodiments, the computer system 100 will further comprise a working memory 135, which can include a RAM or ROM device, as described above.

The computer system 100 also can comprise software elements, shown as being currently located within the working memory 135, including an operating system 140 and/or other code, such as one or more application programs 145, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 125 described above. In some cases, the storage medium might be incorporated within a computer system, such as the system 100. In other embodiments, the storage medium might be separate from a computer system (i.e., a removable medium, such as a compact disc, etc.), and is provided in an installation package, such that the storage medium can be used to program a general purpose computer with the instructions/code stored thereon. These instructions might take the form of executable code, which is executable by the computer system 100 and/or might take the form of source and/or installable code, which, upon compilation and/or installation on the computer system 100 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 100) to perform methods of the invention. According to a set of embodiments, some or all of the procedures of such methods are performed by the computer system 100 in response to processor 110 executing one or more sequences of one or more instructions (which might be incorporated into the operating system 140 and/or other code, such as an application program 145) contained in the working memory 135. Such instructions may be read into the working memory 135 from another machine-readable medium, such as one or more of the storage device(s) 125. Merely by way of example, execution of the sequences of instructions contained in the working memory 135 might cause the processor(s) 110 to perform one or more procedures of the methods described herein.

The terms "machine-readable medium" and "computer readable medium," as used herein, refer to any medium that participates in providing data that causes a machine to operate in a specific fashion. In an embodiment implemented using the computer system 100, various machine-readable media might be involved in providing instructions/code to processor(s) 110 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media includes, for example, optical or magnetic disks, such as the storage device(s) 125. Volatile media includes, without limitation, dynamic memory, such as the working memory 135. Transmission media includes coaxial cables, copper wire and fiber optics, including the wires that comprise the bus 105, as well as the various components of the communications subsystem 130 (and/or the media by which the communications subsystem 130 provides communication with other devices). Hence, transmission media can also take the form of waves (including without limitation radio, acoustic and/or light waves, such as those generated during radio wave and infrared data communications).

Common forms of physical and/or tangible computer-readable media include, for example, a floppy disk, a flexible disk, a hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 110 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 100. These signals, which might be in the form of electromagnetic signals, acoustic signals, optical signals and/or the like, are all examples of carrier waves on which instructions can be encoded, in accordance with various embodiments of the invention.

The communications subsystem 130 (and/or components thereof) generally will receive the signals, and the bus 105 then might carry the signals (and/or the data, instructions, etc., carried by the signals) to the working memory 135, from which the processor(s) 110 retrieves and executes the instructions. The instructions received by the working memory 135 may optionally be stored on a storage device 125 either before or after execution by the processor(s) 110.

Figure 2:
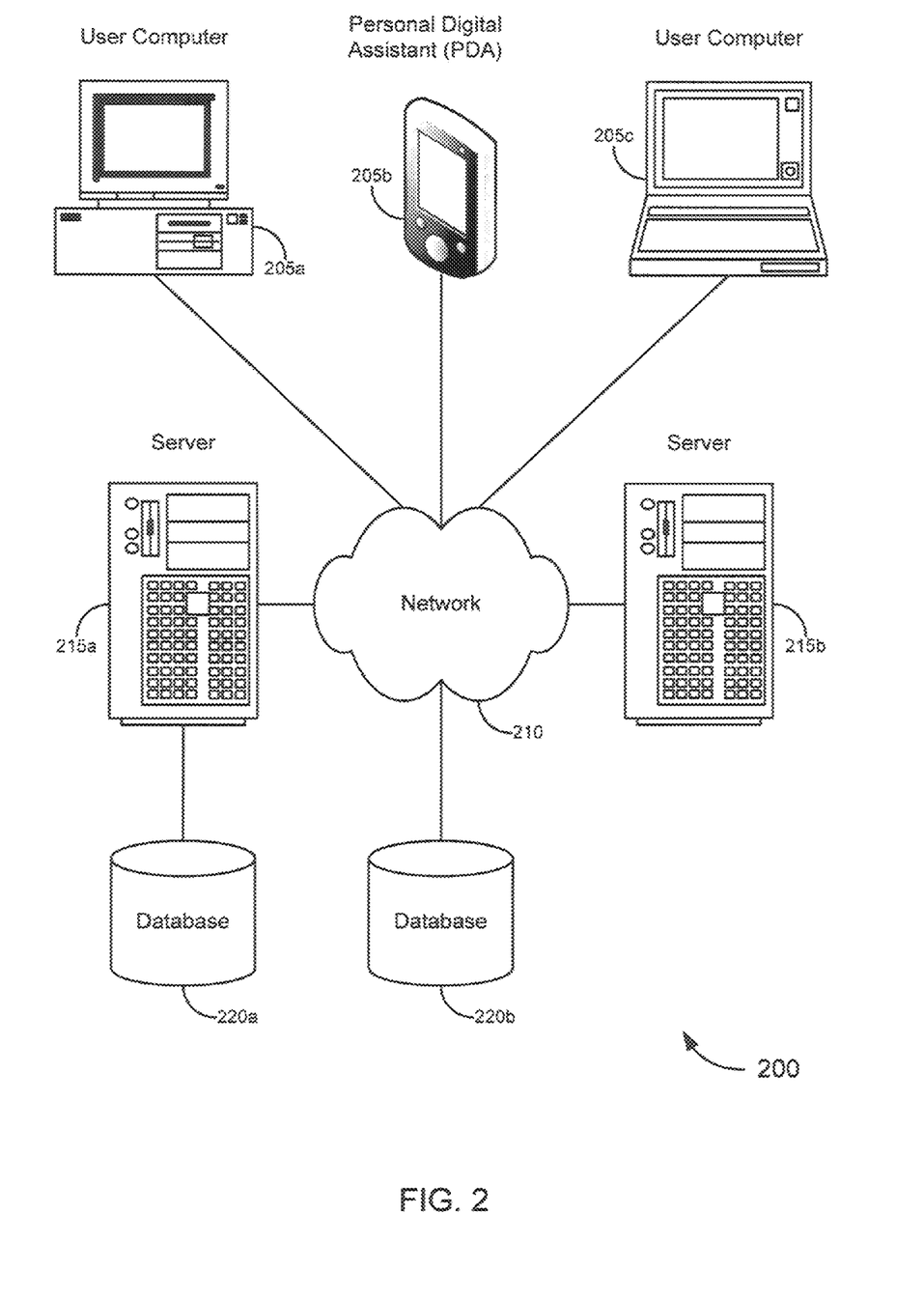
FIG. 2 is a block diagram illustrating a networked system of computers, which can be used in accordance with various embodiments of the present invention.

Merely by way of example, FIG. 2 illustrates a schematic diagram of a system 200 that can be used in accordance with one set of embodiments. The system 200 can include one or more user computers 205. The user computers 205 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially available UNIX™ or UNIX-like operating systems. These user computers 205 can also have any of a variety of applications, including one or more applications configured to perform methods of the invention, as well as one or more office applications, database client and/or server applications, and web browser applications. Alternatively, the user computers 205 can be any other electronic device, such as a thin-client computer, Internet-enabled mobile telephone, and/or personal digital assistant (PDA), capable of communicating via a network (e.g., the network 210 described below) and/or displaying and navigating web pages or other types of electronic documents. Although the exemplary system 200 is shown with three user computers 205, any number of user computers can be supported.

Certain embodiments of the invention operate in a networked environment, which can include a network 210. The network 210 can be any type of network familiar to those skilled in the art that can support data communications using any of a variety of commercially available protocols, including without limitation TCP/IP, SNA, IPX, AppleTalk, and the like. Merely by way of example, the network 210 can be a local area network ("LAN"), including without limitation an Ethernet network, a Token-Ring network and/or the like; a wide-area network (WAN); a virtual network, including without limitation a virtual private network ("VPN"); the Internet; an intranet; an extranet; a public switched telephone network ("PSTN"); an infrared network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 215. Each of the server computers 215 may be configured with an operating system, including without limitation any of those discussed above, as well as any commercially (or freely) available server operating systems. Each of the servers 215 may also be running one or more applications, which can be configured to provide services to one or more clients 205 and/or other servers 215.

Merely by way of example, one of the servers 215 may be a web server, which can be used, merely by way of example, to process requests for web pages or other electronic documents from user computers 205. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computers 205 to perform methods of the invention.

The server computers 215, in some embodiments, might include one or more application servers, which can include one or more applications accessible by a client running on one or more of the client computers 205 and/or other servers 215. Merely by way of example, the server(s) 215 can be one or more general purpose computers capable of executing programs or scripts in response to the user computers 205 and/or other servers 215, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle™, Microsoft™, Sybase™, IBM™ and the like, which can process requests from clients (including, depending on the configuration, database clients, API clients, web browsers, etc.) running on a user computer 205 and/or another server 215. In some embodiments, an application server can create web pages dynamically for displaying the information in accordance with embodiments of the invention. Data provided by an application server may be formatted as web pages (comprising HTML, Javascript, etc., for example) and/or may be forwarded to a user computer 205 via a web server (as described above, for example). Similarly, a web server might receive web page requests and/or input data from a user computer 205 and/or forward the web page requests and/or input data to an application server. In some cases a web server may be integrated with an application server.

In accordance with further embodiments, one or more servers 215 can function as a file server and/or can include one or more of the files (e.g., application code, data files, etc.) necessary to implement methods of the invention incorporated by an application running on a user computer 205 and/or another server 215. Alternatively, as those skilled in the art will appreciate, a file server can include all necessary files, allowing such an application to be invoked remotely by a user computer 205 and/or server 215. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 220. The location of the database(s) 220 is discretionary. Merely by way of example, a database 220a might reside on a storage medium local to (and/or resident in) a server 215a (and/or a user computer 205). Alternatively, a database 220b can be remote from any or all of the computers 205, 215, so long as the database can be in communication (e.g., via the network 210) with one or more of these. In a particular set of embodiments, a database 220 can reside in a storage-area network ("SAN") familiar to those skilled in the art. (Likewise, any necessary files for performing the functions attributed to the computers 205, 215 can be stored locally on the respective computer and/or remotely, as appropriate.) In one set of embodiments, the database 220 can be a relational database, such as an Oracle™ database, that is adapted to store, update, and retrieve data in response to SQL-formatted commands. The database might be controlled and/or maintained by a database server, as described above, for example.

Figure 3:
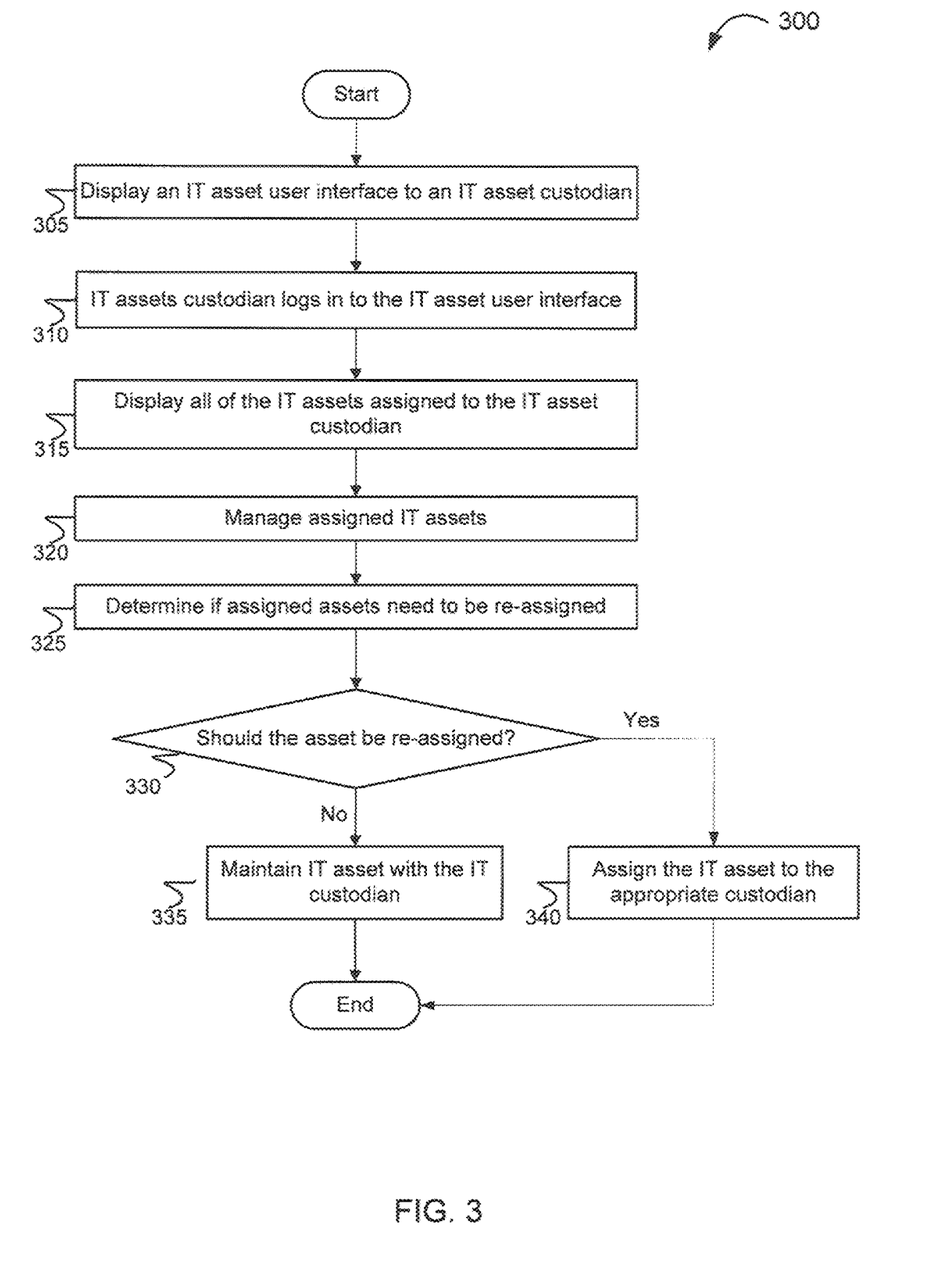
FIG. 3 is a flow diagram illustrating a method of providing consolidated self service IT asset management, in accordance with one embodiment of the present invention.

Turning now to FIG. 3, which illustrates a method 300 of providing consolidated self service IT asset management, in accordance with one embodiment of the present invention. At process block 305, an IT asset user interface (UI) may be displayed to an IT asset custodian. The UI may include a log in screen for which the UI asset custodian may enter a username and password combination in order to gain access to the UI (process block 310). Accordingly, the information displayed to the UI asset custodian will be associated with the UI asset custodian.

At process block 315, the IT asset UI may display all of the IT assets assigned/associated with the IT asset custodian. For example, for any given IT asset custodian, any number of IT assets may be assigned to the custodian. In one embodiment, an IT asset includes a software application, a hardware device (e.g., a PDA, a laptop, a server, a cellular telephone, etc.), or a combination of hardware and software. Furthermore, the assignments of the IT assets may be stored in a number of various locations. For example, some of the software asset assignments may be stored in a compliance database, whereas the hardware assignments may be stored in an asset repository. As such, by the IT asset UI displaying all of the assigned assets for a given IT asset custodian in a single UI, the IT asset custodian is able to have a complete consolidated view of their assigned assets, as opposed to logging on and viewing different locations.

Accordingly, such a consolidated manager and/or group owner of IT asset custodian self service view combines the data from all different data sources into a single view (process block 320). This provides a "one stop" view for the end user (e.g., the IT asset custodian, a group manager, a primary user, etc.) to identify all of the information regarding associated assets for which the end users is a group owner, an individual owner, a primary user, or a custodian. Accordingly, a correlated view of information about assets that are actually physically being used by custodians is obtained.

In a further embodiment, details of the use of IT assets by a user across multiple roles may be displayed. Such a view (or UI page) may provide details about assets for which an employee owns as custodian, assets which are associated with employee as a primary user based on, for example, discovery data, software authorizations associated with assigned assets, membership in employee groups, details of device groups that custodian's assets are part of, etc.

In an alternative view, details of an IT asset with hardware attributes and installed software may be displayed. The hardware view might aggregate the data regarding an IT asset on a single page, which would provide hardware details such as: number of CPUs, hardware model, and the like. The view would further provide a list of the software applications that are installed on the asset, and also a list of device groups for which the asset belongs.

Furthermore, in a single location a consolidated audit of the software compliance from the point of view of the end user may be provided. For example, if a software group is afforded 30 licenses for a given software application, then this view would show the actual number of licenses being used and the total allowed number of licenses. As such, the end user can self evaluate whether they are in compliance with the license agreement, and take corrective action accordingly.

Furthermore, software compliance from an employee group owner perspective may also be shown, whereby the owner of an employee group can audit the entire group's compliance across multiple software applications. This may be available in summarized form for each software title, and at detail level of an asset (i.e., by Serial Id, etc.).

Where a user has page access they will also be able to drill from the summary provided to more detailed pages. This allows for those with authority to identify issues with software compliance or asset allocation and make appropriate corrections from a single self service view point.

In a further embodiment of the present invention provide for a organization to protect/limit access that a user may have to information about IT assets. In one embodiment, two levels of data restrictions may be provided. First, in an employee self service view on the asset repository data may be restricted to the IT assets for which the employee is either the primary user, the custodian, the group owner, or the content manager. Second, is where a user can view data pertaining to all assets for which the user's role access permits. The level of access can be defined by the user preference level, and by default the user may be restricted to IT assets for which he/she is a custodian.

The present invention may further provide workflow which allows assets to be financially transferred from one custodian or department to another. Workflow could also be utilized to send out notifications from end user employees to their managers, group owners, or those authorized to resolve asset allocation issues.

Furthermore, at process block 325, a determination may be made by the user (or custodian) whether any of the IT assets currently assigned to the user need to be re-assigned and/or removed from the user. For example, the user may no longer have a need for the hardware or software application. Such as in the situation where the user may have been working on a specific project and needed a specific software application, but the project has been completed and the software is no longer needed. Alternatively, the user may have been working off-site for a period of time and had a need of a laptop, but is now on-site full time and no longer needs the laptop. Furthermore, the use may have a number of software licenses in use which exceed the total number allowed under the license agreement.

Accordingly, at decision block 330, It is determined if any IT assets should be re-assigned. If no assets should be reassigned, then at process block 335, the IT assets currently assigned to the user are maintained. Alternatively, if it is determined that at least one IT asset should be re-assigned, then at process block 340, the user may request that the asset be reassigned to another custodian. As such, actual asset utilization is leveraged, thereby linking assets to users based on actual physical use of the asset despite the user which may be the recorded custodian of the asset identified in the asset repository. Additionally the expense of the asset can more accurately be expensed to the person or organization that is utilizing the asset.

Figure 4:
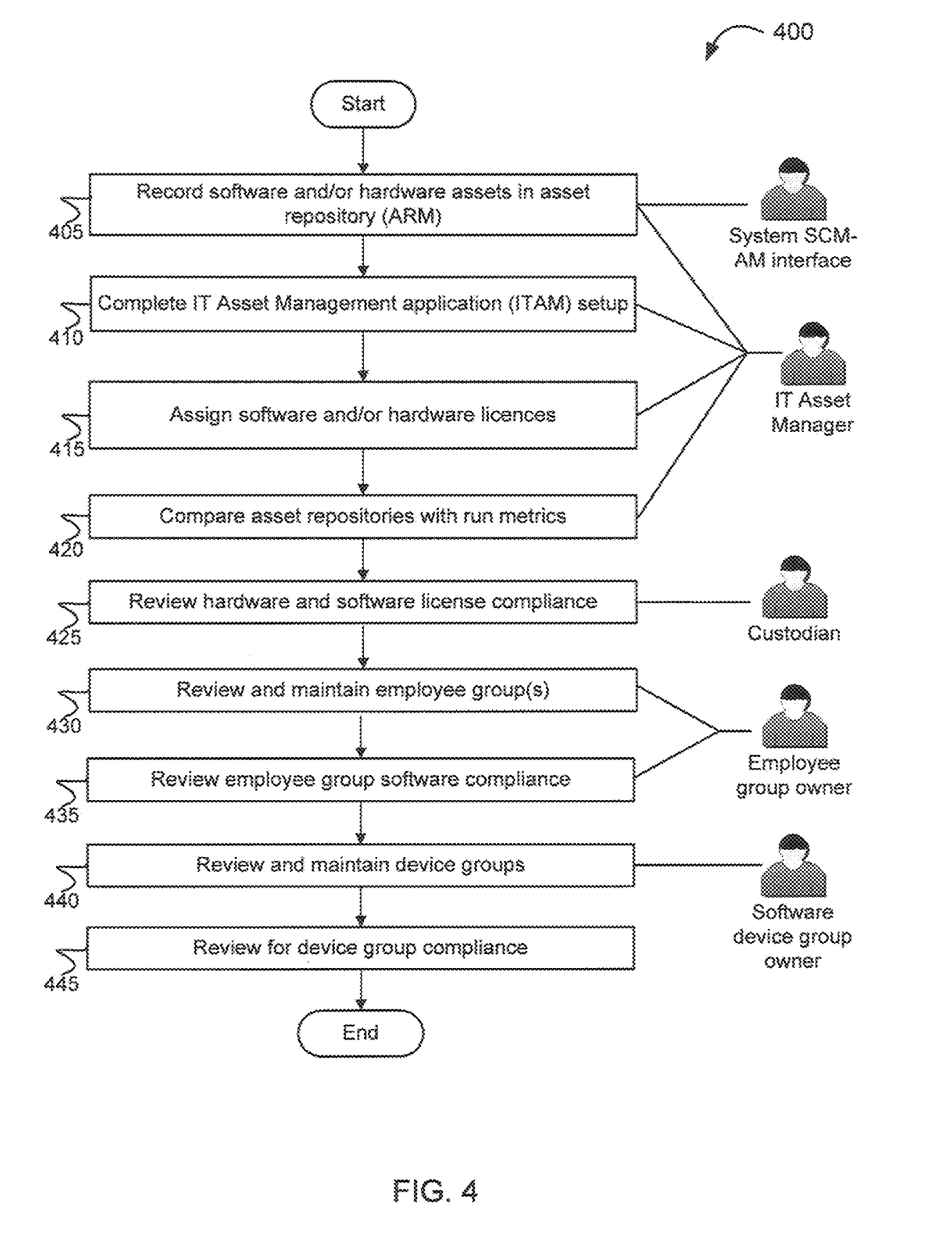
FIG. 4 is a flow diagram illustrating a method of providing consolidated self service IT asset management, in accordance with another embodiment of the present invention.

FIG. 4 illustrates a method 400 of providing consolidated self service IT asset management, in accordance with another embodiment of the present invention. At process block 405, software and/or hardware assets may be recorded in an asst repository (ARM) at a system SCM-AM interface by an IT asset manager. At process block 410, a setup of an IT asset management program (ITAM) may be completed by the IT asset manager.

At process block 415, hardware and/or software application licenses may be assigned to various custodians by the IT asset manager and store in an asset repository. Furthermore, the IT asset assignments stored in the asset repository may compared with a compliance metric (process block 420). In one embodiment, the compliance metric may include a maximum number of licenses allowed for a given software application. The compliance may also include restrictions and/or requirements associated with the software applications.

At process block 425, a custodian may review the hardware and/or software licenses assigned to the custodian to determine if the IT assets are in compliance or are correctly assigned the custodian. In other words, the custodian may perform a self evaluation of the assigned IT assets. At process block 430, an employee group owner may review and maintain employee groups as well as review employee group software license compliance (process block 435). Furthermore, a software device group owner may review and maintain device groups (process block 440). At process block 445, a review may be conducted in order to determine device group compliance.

Turning now to FIG. 5A, which illustrates a user interface for providing consolidated self service IT asset management, in accordance with one embodiment of the present invention. Fields for FIGS. 5A-5E may be described as in Table 1 below:

TABLE 1

| Name | Description | Implications |
| --- | --- | --- |
| Employee | Edit Box with prompt | Employee Id |
| Name | Edit Box - Display Only | Employee Name |
| Transfer Link | Hyperlink to Asset Transfer Request page. | If an asset is to be transferred then AM has an existing functionality in Component |
| Software Title | Edit Box - Hyperlink to Define Software Titles/ Users page | Software Title installed on the hardware asset |
| Authorization Type | Edit Box | Describes if authorization is via group or as an individual |
| Number of Licenses | Edit Box | Number of Licenses allowed |
| Group Name | Edit Box - Hyperlink to Define Employee Groups page | Employee Group Name that the employee is member of |
| Group Description | Edit Box | Employee Group Description |
| Group Owner | Edit Box | Name of Employee Group Owner |
| Group Name | Edit Box - Hyperlink to Software Device Groups page | Device Group Name that the employee is owner of |
| Group Description | Edit Box | Device Group Description |
| Group Owner | Edit Box | Name of Device Group Owner |
| Serial Number | Edit Box - Hyperlink to Device Detail page | Serial Id that uniquely identifies the hardware asset |
| IT Subtype | Edit Box | IT Subtype - provides further classification of hardware assets. |
| Tag No | Edit Box | Asset Tag Number |
| Manufacturer | Edit Box | Manufacturer of asset |
| Model | Edit Box | Model of asset |
| Asset Id | Edit Box | Asset Identification |
| Custodian | Edit Box | Name of custodian |
| Exception | Edit Box | Details of software exception. Blank in case of no exception |

FIG. 5A shows software authorizations for a given user/custodian. Further, FIG. 5B shows an employee group tab, while FIG. 5C shows a device group tab. For example, a device group may be a server farm (i.e., Priority One servers) or a collection of similar devices. Furthermore, FIG. 5D shows the IT devices for which a specific user is a custodian, while FIG. 5E shows a tab for which a user is a primary user of a device. Each of these UI interfaces shown in FIGS. 5A-5E may be modified as appropriate, and also may be integrated into the IT asset management system in accordance with aspects of the present invention.

Referring next to FIG. 6A, which illustrates a user interface for providing consolidated self service IT asset management, in accordance with a further embodiment of the present invention. Fields for FIGS. 6A-6C may be described as in Table 2 below:

TABLE 2

| Name | Description | Implications |
| --- | --- | --- |
| Employee | Edit Box with prompt. | Employee Id |
| Software Title | Edit Box - Hyperlink to Define Software Titles/ Users page | Software Title installed on the hardware asset |
| Employee | Edit Box | Employee Name |
| Serial Number | Edit Box - Hyperlink to Device Detail page | Serial Id that uniquely identifies the hardware asset |
| Exception | Edit Box | Details of software exception. Blank in case of no exception |
| Total Run Time | Edit Box | Total Run Time in seconds |
| Authorization Type | Edit Box | As an individual or as part of a group. |
| Authorized | Edit Box | Number of licenses authorized |
| Installed | Edit Box | Number of licenses actually installed. |

FIG. 6A shows details of exceptions for software titles that are installed on one or more of a custodian's IT assets. For example, this custodian if over the allotted license limit on four software applications and is unauthorized to use one software application. Accordingly, the user may use the self service interface to notify the asset group owner that either the license limit needs to be increased for the over the limit applications or that the applications need to be removed. Likewise, the user could request authorization for the unauthorized application.

FIG. 6B shows a summarized and detailed view of software applications which are installed by employees in an employee group and the associated compliance status. There are two grids shown, top portion of the page is the summarized view and bottom portion is the detailed view. This page may assist an employee group owner with ensuring compliance with software license agreements for the employee group.

Turning now to FIG. 6C, which shows both hardware and software details regarding a given IT asset, and details of a device group for which an asset is a member. In the situation where an IT asset that does not exist in the ARM, attributes such as Asset Tag, Asset Id, business unit, authorization model, custodian, etc. may not be shown. Other attributes such as manufacturer, model, and installed software may only be shown.

Figure 7:
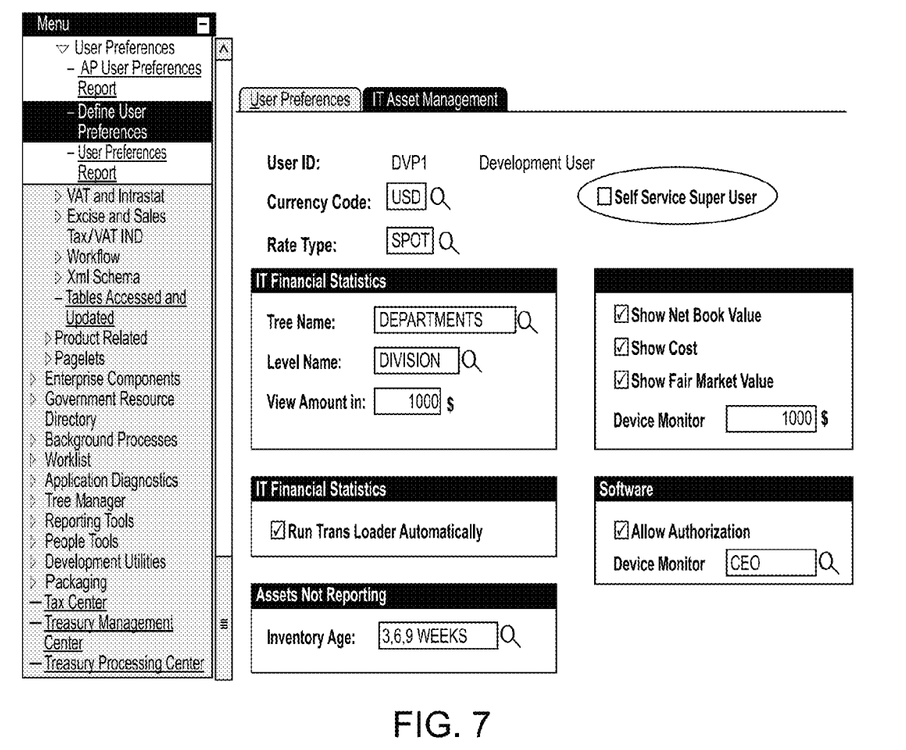
FIG. 7 illustrates a user interface for providing consolidated self service IT asset management, in accordance with one embodiment of the present invention.

FIG. 7 illustrates a user interface for providing consolidated self service IT asset management, in accordance with one embodiment of the present invention. Fields for FIG. 7 may be described as in Table 3 below:

TABLE 3

| Name | Description | Implications |
| --- | --- | --- |
| Self Service Super User | Check Box | This flag decides domain of the asset data user has access for. Default is deselected-it means the user has an access to only those assets that he is a custodian for. If selected then it means that the user is an ITAMGR and has access to all assets covered by his Role Access privileges. |

FIG. 7 shows a mechanism for defining user preferences. Parameters may be specified with this interface that affect the way in which data is presented to the user.

Figure 8:
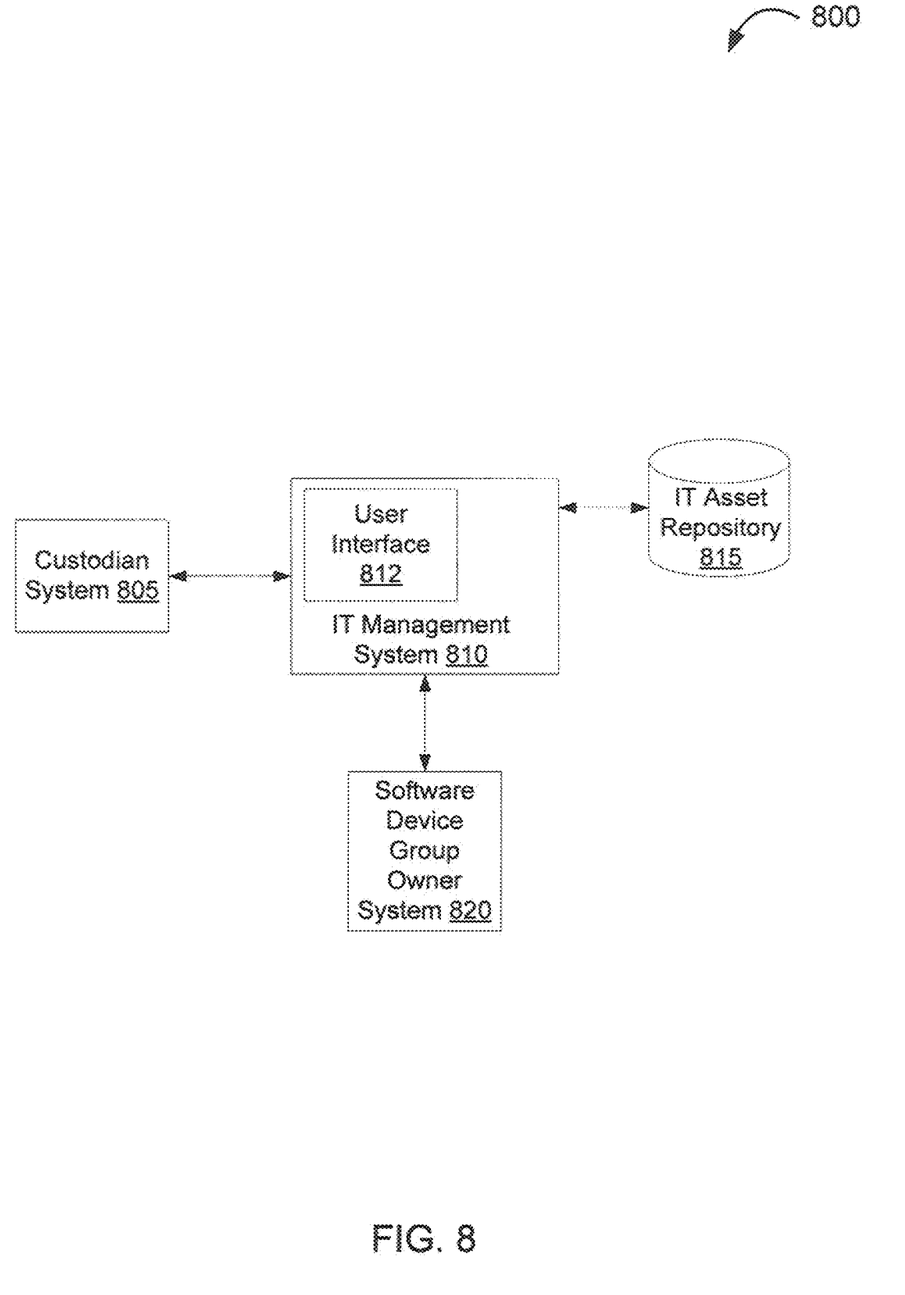
FIG. 8 is a block diagram illustrating a system of providing consolidated self service IT asset management, in accordance with another embodiment of the present invention.

Now turning to FIG. 8, which illustrates a system 800 for providing consolidated self service IT asset management. In one embodiment, system 800 may include a custodian system 805 for which an IT asset custodian may be using to access a user interface 812 running on an IT management system 810. In one embodiment, user interface 812 may be any one of the user interfaces in FIGS. 5A-5E, FIGS. 6A-6C, and FIG. 7. Furthermore, IT asset management system 810 may be configured to implement the methods described in methods 300 and 400 of FIGS. 3 and 4.

System 800 may further include an IT assets repository and a software device group owner system 820. Accordingly, custodian system 805 may access IT management system 810 via user interface 812 in order to obtain a consolidated view of all IT asserts for which the user is a custodian. Furthermore, the custodian can manage and/or request re-assignment of various IT assets in order to provide an actual physical view of the IT assets for which he/she is an active custodian.

Furthermore, software device group owner system 820 may provide a software device group owner with access to a consolidated view of IT assets in the software device group for which he/she is owner. Further, the software device group owner may be able to manage and/or maintain the IT assets for the group using IT asset management system 810 via user interface 812.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware, and/or software configuration. Similarly, while various functionalities are ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method of providing consolidated self-service IT asset management, the method comprising:
    receiving, at an information technology (IT) asset management system, a communication from a user device;
    identifying, at the IT asset management system, an IT assets custodian that corresponds to the user device based on the communication, the IT asset custodian is associated with a first role identifying a first type of asset assignment and a second role identifying a second type of asset assignment;
    querying, by the IT asset management system, a first database using an identifier of the IT assets custodian to identify one or more first IT assets assigned to the IT assets custodian, the first database being associated with the first role, the one or more first IT assets including a portable hardware device;
    querying, by the IT asset management system, a second database using an identifier of the IT assets custodian to identify one or more second IT assets assigned to the IT assets custodian, the second database being associated the second role;
    generating, at the IT asset management system, an asset management user interface that includes an aggregated view identifying IT assets assigned to the IT assets custodian, the aggregated view identifying each of the one or more first IT assets and each of the one or more second IT assets;
    transmitting, from the IT asset management system, the asset management user interface to the user device;
    monitoring a physical usage of at least one of the one or more assigned IT assets;
    determining, by the IT asset management system based on the monitoring, that the at least one of the assigned IT assets is to be re-assigned from the IT asset custodian to another IT asset custodian;
    assigning, by the IT asset management system, the at least one of the assigned IT assets to the another IT asset custodian; and
    removing, by the IT asset management system, an assignment of the at least one of the assigned IT assets from the IT asset custodian.

2. The method of providing consolidated self service IT asset management as recited in claim 1, wherein the monitoring further includes monitoring a location of the IT asset custodian.

3. The method of providing consolidated self service IT asset management as recited in claim 2, further comprising:
    detecting, based on the monitoring, that a location of the IT asset custodian has changed, wherein the determination that the at least one of the assigned IT assets is to be re-assigned is made in response to the detection.

4. The method of providing consolidated self service IT asset management as recited in claim 2, wherein monitoring the location of the IT asset custodian includes determining whether the IT asset custodian is at a location corresponding to a site of an organization, the custodian being an employee of the organization.

5. The method of providing consolidated self service IT asset management as recited in claim 1, further comprising:
    detecting, based on the monitoring, that the another IT assets custodian is using the at least one of the assigned IT assets, wherein the determination that the at least one of the assigned IT assets is to be re-assigned is made in response to the detection.

6. The method of providing consolidated self service IT asset management as recited in claim 1, further comprising:
    generating a new version of the asset management user interface that identifies updated IT assets assigned to the IT assets custodian, the at least one of the assigned IT assets being removed from the updated IT assets.

7. The method of providing consolidated self service IT asset management as recited in claim 1, wherein the communication from the user device includes a username and password.

8. The method of providing consolidated self service IT asset management as recited in claim 1, wherein:
    a plurality of roles includes an owner of an IT asset, a primary user of an IT asset, and a membership in an employee group associated with an IT asset;
    the first role includes one of the plurality of roles; and
    the second role includes another of the plurality of roles.

9. The method for providing consolidated self service IT asset management as recited in claim 1, further comprising:
    determining, for an IT asset of the assigned IT assets, whether one or more assignments corresponding to the IT asset are compliance with a license allotment or usage restriction associated with the IT asset;
    wherein the asset management user interface includes an indication as to whether the one or more assignments corresponding to the IT asset are compliant.

10. The method of providing consolidated self service IT asset management as recited in claim 1, wherein the assigned IT assets further include an authorization to use particular software.

11. A system comprising:
    one or more processors; and
    a memory having stored therein a sequence of instructions which, when executed by the one or more processors, cause the one or more processors to perform actions including:
    receiving a communication from a user device;
    identifying an IT assets custodian that corresponds to the user device based on the communication, the IT asset custodian is associated with a first role identifying a first type of asset assignment and a second role identifying a second type of asset assignment;
    querying a first database using an identifier of the IT assets custodian to identify one or more first IT assets assigned to the IT assets custodian, the first database being associated with the first role, the one or more first IT assets including a portable hardware device;
    querying a second database using an identifier of the IT assets custodian to identify one or more second IT assets assigned to the IT assets custodian, the second database being associated with the second role;

generating an asset management user interface that includes an aggregated view identifying IT assets assigned to the IT assets custodian, the aggregated view identifying each of the one or more first IT assets and each of the one or more second IT assets;

transmitting the asset management user interface to the user device;

monitoring a physical usage of at least one of the one or more assigned IT assets;

determining, based on the monitoring, that the at least one of the assigned IT assets is to be re-assigned from the IT asset custodian to another IT asset custodian;

assigning the at least one of the assigned IT assets to the another IT asset custodian; and removing an assignment of the at least one of the assigned IT assets from the IT asset custodian.

12. The system as recited in claim 11, wherein the monitoring further includes monitoring a location of the IT asset custodian.

13. The system as recited in claim 12, wherein the actions further include:

detecting, based on the monitoring, that a location of the IT asset custodian has changed, wherein the determination that the at least one of the assigned IT assets is to be re-assigned is made in response to the detection.

14. The system as recited in claim 12, wherein monitoring the location of the IT asset custodian includes determining whether the IT asset custodian is at a location corresponding to a site of an organization, the custodian being an employee of the organization.

15. The system as recited in claim 11, wherein the actions further include:

detecting, based on the monitoring, that the another IT assets custodian is using the at least one of the assigned IT assets, wherein the determination that the at least one of the assigned IT assets is to be re-assigned is made in response to the detection.

16. The system as recited in claim 11, wherein the actions further include:

generating a new version of the asset management user interface that identifies updated IT assets assigned to the IT assets custodian, the at least one of the assigned IT assets being removed from the updated IT assets.

17. The system as recited in claim 11, wherein the communication from the user device includes a username and password.

18. The system as recited in claim 11, wherein:

a plurality of roles includes an owner of an IT asset, a primary user of an IT asset, and a membership in an employee group associated with an IT asset;

the first role includes one of the plurality of roles; and the second role includes another of the plurality of roles.

19. The system as recited in claim 11, wherein the actions further include:

determining, for an IT asset of the assigned IT assets, whether one or more assignments corresponding to the IT asset are compliance with a license allotment or usage restriction associated with the IT asset;

wherein the asset management user interface includes an indication as to whether the one or more assignments corresponding to the IT asset are compliant.

20. The system as recited in claim 11, wherein the assigned IT assets further include an authorization to use particular software.

* * * * *

UNITED STATES PATENT AND TRADEMARK OFFICE
CERTIFICATE OF CORRECTION

PATENT NO. : 9,582,776 B2  
APPLICATION NO. : 12/576988  
DATED : February 28, 2017  
INVENTOR(S) : Apte et al.

Page 1 of 1

It is certified that error appears in the above-identified patent and that said Letters Patent is hereby corrected as shown below:

On the Title Page

Column 2, under Abstract, Line 11, delete "management" and insert -- manage --, therefor.

On page 2, Column 2, under Other Publications, Line 8, delete "eXtremists," and insert -- extremists, --, therefor.

In the Drawings

On sheet 5 of 8, in FIG 5A, Line 13, delete "Autorization" and insert -- Authorization --, therefor.

In the Specification

In Column 2, Line 54, delete "management" and insert -- manage --, therefor.

In Column 9, Line 64, delete "asst" and insert -- asset --, therefor.

Signed and Sealed this  
Twenty-second Day of August, 2017

Joseph Matal  
*Performing the Functions and Duties of the*  
*Under Secretary of Commerce for Intellectual Property and*  
*Director of the United States Patent and Trademark Office*